Nov. 29, 1966 L. J. O'BRIEN ETAL 3,288,212
SECONDARY OIL RECOVERY METHOD

Filed May 21, 1964 2 Sheets-Sheet 1

INVENTORS.
LEROY W. HOLM
LEO J. O'BRIEN
BY FRANK WALTER

ATTORNEY.

3,288,212
SECONDARY OIL RECOVERY METHOD
Leo J. O'Brien, Le Roy W. Holm, and Frank Walter, Crystal Lake, Ill., assignors, by mesne assignments, to Union Oil Company of California, Los Angeles, Calif., a corporation of California
Filed May 21, 1964, Ser. No. 369,116
8 Claims. (Cl. 166—9)

The present invention broadly concerns a secondary recovery method for obtaining oil from subterranean oil-bearing formations which have been waterflooded or are subject to a waterflooding process.

The most widely accepted means of primary recovery of oil are those wherein wells are drilled to a depth sufficient to penetrate the oil-bearing strata. Thereafter the formation is released to pressure drive the petroleum to the surface of the earth. However, instances arise wherein it is necessary to maintain this natural energy within the formation, which exists either as gas in solution in the oil or as a free gas cap, because of conservation practices or pecularities in oil lease boundaries. In such an instance it is mandatory that the oil-bearing section of the formation be isolated from the gas-bearing or gas cap section of the formation. It is often desirable to confine and maintain the pressure in a reservoir created by the presence of a gas cap since the depletion of this formation gas would cause the oil in the rock to migrate towards the area of decreasing pressure wherein a great deal of wastage would occur since the oil would be driven into portions of the reservoir in which it would not be economically feasible to attempt recovery of it.

The production of oil from subterranean formations while conserving the natural formation energy, and the maintenance of the gas cap is a formidable problem for which various solutions have been proposed. The most common solution is that as set out in U.S. Patents 1,198,078 and 2,842,204 wherein border injection wells are placed at the periphery of the gas cap oil-reservoir contact or formation to be confined and water is injected into these wells. The injection of water in the approximate vicinity of the gas cap or gas-oil transition zones forms an effective water block or dam which prevents the expansion of the gas into the oil-bearing portion of the reservoir and conversely inhibits the flow of oil from the oil rock into the gas-bearing portion of the reservoir. It has also been suggested to inject a foaming agent in proximity to the free gas in which event the gas would generate foam thereby forming an effective foam barrier through which the free gas could not migrate. While not as efficient, other fluids such as natural gas, air and other gases could be utilized in place of water to effect a satisfactory dam. While the injection of the water at the gas oil interface has effectively isolated the gas-bearing portion of the reservoir from the oil-bearing portion, the only practical available means of producing oil from the reservoir is by using some or all of the injected water as a displacement medium. However, by the use of a water drive alone it is well known that it has usually been impossible to recover over 50% of the oil originally contained in the reservoir. Attempts to initiate other more effective secondary recovery methods such as the solvent slug technique have not always been effective.

The effectiveness of a solvent in secondary recovery methods is dependent upon the injected solvent contacting and sweeping as great a portion of the oil-bearing formation as is possible. The amount of oil produced and the economics involved in the use of the solvent in relation to the amount of solvent injected per barrel of oil recovered determines and dictates the feasibility of producing any one reservoir. In a system where a formation or reservoir is subject to the introduction of water for one reason or another, the use of effective solvent recovery techniques is limited because of the poor sweep efficiency or limited areas of the formation contacted by the solvent caused by the solvent being diluted and channeled through the more permeable strata by the floodwater, carrying the solvent through the formation to the producing wells without the solvent contacting an appreciable portion of the oil-bearing rock. If an injected solvent can penetrate and contact a greater portion of the oil-bearing formation into which it is injected, more oil will be produced per volume of solvent injected thereby making it practical to continue production.

In accordance with this invention, we have found that where a subterranean oil-bearing formation, traversed by a plurality of wells, is subjected to a secondary recovery method by injecting a first fluid, preferably aqueous, into a first injection well and producing oil from a first production well, an improved recovery results by: (1) injecting a second fluid into said formation through a second injection well intermediate said first injection well and said first producing well, and (2) simultaneously withdrawing a portion of the first injected fluid, preferably aqueous, from a second producing well in an area adjacent to and upstream from said second injection well. By this technique, a pressure gradient is created in the area of the second injection well, which gradient causes greater radial flow from the second injection well, thereby causing the second injected fluid to sweep a larger portion of the reservoir with a consequent improved production of oil at the first production well.

An object of the invention is to provide an improved oil recovery method whereby additional oil is recovered from an oil-bearing formation. Another object of this invention is to provide a method whereby an entire oil field is effectively produced.

It is also an object of the invention to provide a method of improved solvent recovery wherein it is desired to conserve the inherent energy of an oil and gas bearing formation or reservoir. A further object of this invention is to provide a method whereby the solvent in a solvent recovery method contacts a greater portion of the oil-bearing formation while the formation is subject to a continuous water-flood.

Other objects of the invention will be apparent to one skilled in the art from the following description and accompanying drawings.

The drawings are diagrammatic representations of developed oil fields showing a plurality of wells.

The formation represented and the wells shown are for illustrative purposes only and our invention is not to be limited to any particular formation or well pattern.

Figure 2:
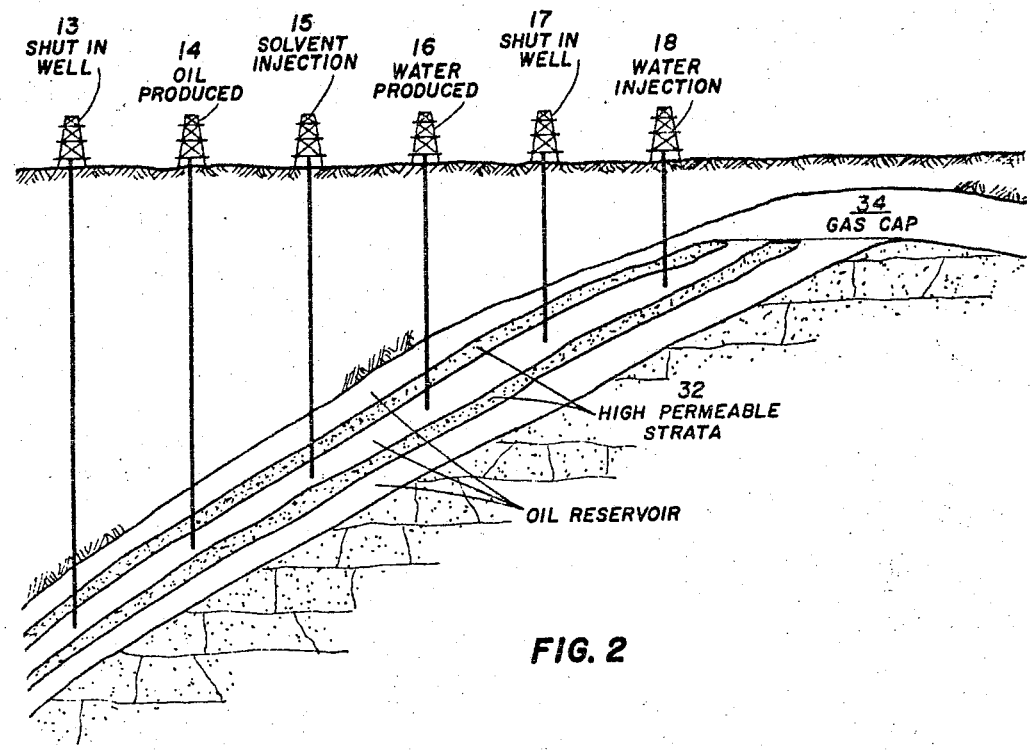
FIGURE 2 shows a cross-sectional view taken at a plane 2—2 of FIGURE 1.
Figure 1:
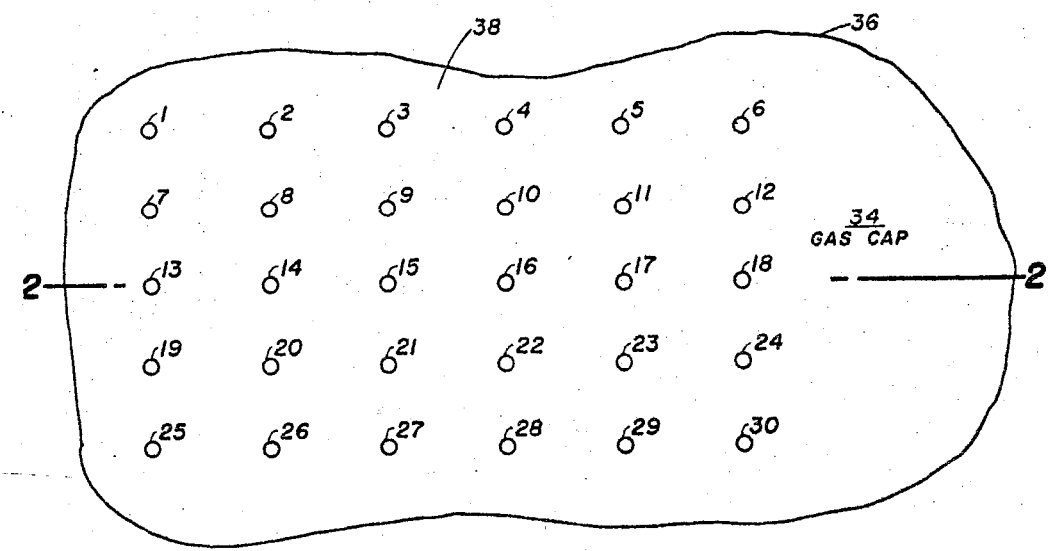
FIGURE 1 depicts a plan view of the field showing the relative locations of wells drilled for water injection to separate the oil-bearing portion of the formation from the gas-bearing portion of the formation, oil production wells, and wells drilled for the purpose of solvent injection in accordance with the principles of the instant invention.
Figure 4:
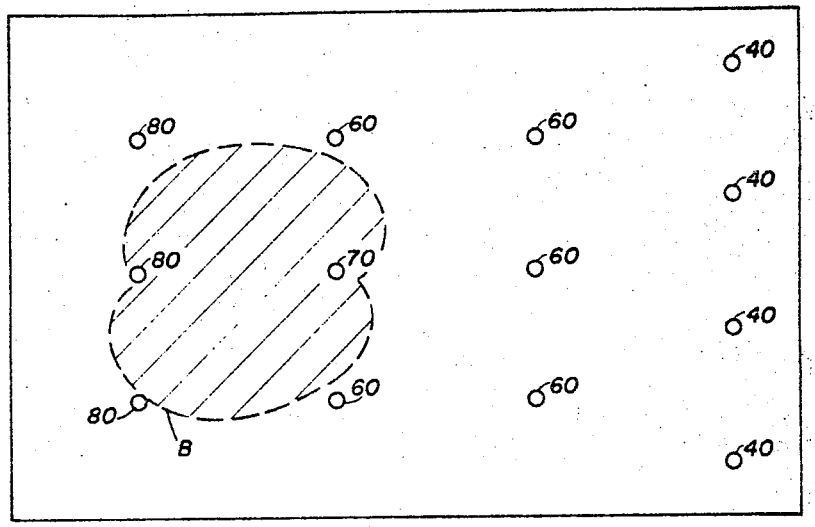
FIGURE 4 depicts the same portion of an oil field as in FIGURE 3 modified in the practice of this invention. Shaded area B shows that area of the formation contacted or swept by an injected fluid using the mode of this invention.
Figure 3:
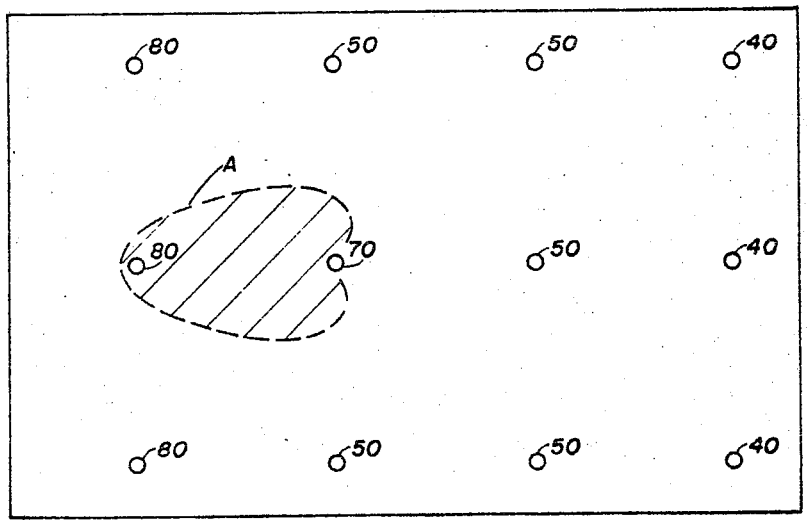
FIGURE 3 shows a portion of an oil field in which wells have been provided for the systematic production of the field. Shaded area A, calculated from model studies, defines the area of the formation contacted by an injected fluid.

As can be seen from FIGURE 1, a row of water injection wells 6, 12, 18, 24, 30 have been placed at the periphery of a gas cap 34 and water is injected through these wells to curtail the migration of the formation gas towards the open producing well 14. The injection of water in the particular region indicated forms a water block which effectively prevents the gas cap from expanding into the oil-bearing area of the formation. Line 36 defines the gas- and oil-bearing area of the formation. As water injection continues, a portion of the floodwater displaces the reservoir oil contained in the interstices of the formation 38 driving the displaced oil to the producing well 14. The continuous flood of water soon displaces most of the oil contained in the more porous strata and begins to channel through these more porous strata towards the producing well leaving a large amount of residual oil in the less permeable or tighter oil-bearing rock. As can be seen from FIGURE 2, any water injected tends to follow the path of least resistance and will be channeled through highly permeable streaks 32 at a velocity in excess of the water movement adjacent to these streaks. Any attempt to practice conventional solvent recovery techniques, under these conditions, are ineffective since the solvent penetrates through the formation towards the permeable strata and is taken up in the on-rushing flow of the injected water in these porous channels and is carried to and produced from the producing well 14 without contacting an appreciable portion of the tight, less permeable oil-bearing rock. However, returning to FIGURE 1 in the practice of this invention, water is produced from the plurality of wells 9, 10, 16, 21, 22 surrounding the solvent injection well 15, thereby creating a zone of low hydrostatic pressure relative to the portion of the reservoir upstream of the solvent injection well thereby permitting the injected solvent to flow radially from the injection well to portions of the reservoir containing the residual oil. While a pressure gradient is created by producing water from the wells within the injection well area, a portion of the floodwater injected in the first row of wells 6, 12, 18, 24, 30 in the vicinity of the gas cap 34 is not entirely produced from the reservoir by means of the water producing wells 9, 10, 16, 21, 22 thereby permitting the unproduced floodwater to drive the solvent through the formation flushing out additional oil and driving the solvent and oil to the production well 14 downstream from the solvent injection well. Wells 1–5, 25–29 inclusive and 7, 8, 11, 13, 17, 19, 20, 23 designate closed or shut in wells which previously were or subsequently will be either oil producing, water producing or solvent injection wells. In the practice of this invention it is only necessary that water be produced from wells in line with or upstream of the solvent injection well such that a pressure gradient exists within the area immediate to the solvent injection well. Referring now to FIGURE 3, wherein a portion of an oil field is shown, a plurality of wells have been drilled in order to produce the field. Water wells 40 are placed at the edge of the free gas area not shown, which area is bounded by a line intersecting the water injection wells. Water is injected into wells 40 to separate the gas-bearing and oil-bearing sections of the formation, so that movement of fluids within the formation is from wells 40 towards wells 80. Closed or shut-in wells are designated 50, and these wells are furnished for further use in developing the oil field. Wells 80 are open producing wells, and well 70 is an injection well through which fluids, such as any of the solvents that are customarily used in the recovery of oil from subterranean formations, are to be injected to contact the formation and drive oil and fluids from the vicinity of well 70 to wells 80, from whence oil, water and the aforementioned injected fluids are produced. The shaded area designated A, demonstrates the area of the formation contacted or swept by the fluids injected into well 70. This area has been determined from actual model studies, simulating an oil field under the conditions shown. FIGURE 4, showing that portion of the formation contacted by the injected fluid as shaded area B clearly indicates the advantage to be obtained in the practice of this invention over the conventional method depicted in FIGURE 3. In practicing this invention wells 40 remain water injection wells, wells 50 remain closed-in wells and wells 80 remain open producing wells. However, as can be seen the solvent contact area B is much larger than contact area A in FIGURE 3. Greater area contact is achieved, and thereby more oil produced, by allowing wells 60 to become water producing wells rather than remaining shut-in wells as in FIGURE 3. Those skilled in the art can readily observe, from the foregoing description, how this invention can be applied and practiced on an entire oil field. For instance, referring to FIGURE 1, after a portion of the reservoir has been produced using secondary methods employing a solvent as hereinbefore described, the procedure may be moved from one row or set of wells to the next. In this embodiment the water injection wells 6, 12, 18, 24, and 30 would still serve as water injection wells with the injection of water being continued to inhibit migration of the free gas 34 in an area 38 towards open producing wells. The wells 5, 11, 17, 23, and 29 would continue to be shut in. All of the wells 4, 10, 16, 22 and 28 would now be shut in. Well 14 would now serve as the solvent injection well while well 13 would now function as the producing well. Wells 8, 9, 15, 20 and 21 would be allowed to produce water, which production would create a pressure gradient within the immediate vicinity of the solvent injection well 14, thereby allowing the solvent to contact a greater portion of the reservoir, in the area immediate to the solvent injection well, than when water is not produced. In similar fashion the same procedure can be employed across the field in a lateral fashion. The type of subterranean formation shown, the number of wells indicated and the particular pattern of injection and producing wells shown are not to be taken as limitations and are merely used for describing the invention. Most field wide applications of the invention will be conducted where a number of producing wells are made available so as to take advantage of the conventional five, seven or nine spot pattern of secondary oil recovery.

It is possible in this specification only to describe a few of the conditions under which the method of this invention will be especially suited, but it has been sought to emphasize throughout that there is involved an improved principle on which the invention is based and the invention is not to be limited to the applications shown in the drawings. The spirit of the invention will not be violated if several producing and solvent injection wells are utilized instead of one well as has been used to describe the invention hereinbefore. Practical aspects will usually dictate the use of one solvent injection well. However, more than one producing well will be used whenever conditions warrant the use of multiple producing wells. When a multiplicity of solvent injection wells are used, it is only necessary in the practice of this invention that sufficient fluids be produced within the area of the solvent injection wells so as to decrease the hydrostatic pressure in these regions relative to the remainder of the formation. By increasing this pressure differential, the injected solvent will be able to attain a higher sweep efficiency, thereby contacting more of the formation and thusly effecting greater oil recovery.

When used in this description solvent secondary recovery method is meant to be any method of practicing the recovery of oil wherein the efficiency of an injected fluid is dependent upon it contacting a substantial portion of the oil-bearing formation before being produced from the formation. Solvents contemplated in the practice of this invention but not limited thereto include natural gas, liquefied hydrocarbons such as LPG, alcohol, carbon dioxide, and the lower boiling mineral oil fractions such as gasoline and kerosine. In actual practice it is also desirable to follow the injected solvent or fluid by a driving fluid such as thickened water, carbonated water or surfactant solutions, gas, etc., and combinations thereof. In such an instance the first injected fluid or water utilized to maintain the gas in one region of the reservoir will coact with the driving fluid injected after the solvent to drive the second injected fluid or solvent to the producing wells.

The methods of water and solvent injection, as well as the type of solvent employed is within the skill of one working in the art and is outside the scope of this invention. The pressures involved are not important in the practice of this invention, consideration however, being given to the type of solvent used. Any range of pressures may be employed and need be only great enough to drive the injected solvent into the area of low relative pressure created by producing fluids from the solvent injection well area.

The embodiments of the described invention are not intended solely to be restricted to the recovery of oil from subterranean formations. An equivalent application may be one wherein it is desired to effectively treat a portion of a reservoir or formation subject to the influx of fluids without driving the oil contained therein to an outlet well. The most apparent modification of the described invention would be its adaptation in the acidizing of a portion of reservoir rock. In this application formation fluids would be allowed to flow or would be actively pumped from a plurality of wells circumscribing that portion of the formation to be treated. A treating fluid or acid would then be injected, either after producing or while simultaneously producing fluids. The pressure gradient, produced by the removal of these fluids, would allow the acid to effectively flow radially from the injection well contacting greater portions of the formation rock than would have been possible if the fluids were not produced from that portion of the reservoir being treated.

As an example of the disclosed invention, an oil field in which a free gas cap exists is suitably provided with a number of wells which can be either injection or producing wells. The line of wells located at the periphery of the gas-oil interface are used to inject 1000 bbls. of water per day. The injected water separates the oil-bearing portion of the reservoir from the gas-bearing portion. Propane is injected downstream from the water injection wells into one of the wells provided, and propane injection is continued until propane breakthrough occurs in the downstream production well closest to the solvent injection well. Propane breakthrough occurs after 24,000 bbls. of propane have been injected. However, when 800 bbls. of water per day are allowed to flow from wells in line with and upstream of the solvent injection well, propane injected into the reservoir in the amount of 50,000 bbls. has failed to be produced at the closest production well indicating that the solvent has invaded a larger fraction of the formation than when water is not produced in the area immediate to the solvent injection well.

The embodiments of this invention in which an exclusive property or privilege is claimed are defined as follows:

1. In the method of producing petroleum from a fluid-flooded subterranean oil-bearing formation traversed by a plurality of wells wherein a first aqueous fluid is injected into the formation by means of a first injection well and said first fluid is driven through said formation toward a producing well, the improvement comprising injecting a second fluid into said formation through a second injection well intermediate said first injection well and said producing well, and simultaneously withdrawing a portion of said first injected fluid from an area adjacent to and upstream from said second injection well, the withdrawal of said portion of first injected fluid creating a pressure gradient relative to the remainder of said formation and thereby increasing the sweep efficiency of said second injected fluid, and driving said second injected fluid through said formation toward said producing well.

2. The method according to claim 1 wherein said second fluid is a solvent selected from the group consisting of liquefied hydrocarbons, kerosine, gasoline, natural gas, alcohol, carbon dioxide and the lighter fractions of mineral oil.

3. The method according to claim 1 wherein a driving fluid is additionally injected into said second injection well immediately subsequent to said solvent.

4. The method of producing petroleum from a subterranean oil-bearing formation, subject to the continuous influx of aqueous fluids, traversed by a plurality of wells wherein a solvent is introduced into a portion of the formation by means of at least one injection well and said solvent is driven through said formation to at least one production well, the improvement which comprises withdrawing a portion of said influx fluid, downstream from the point of influx and within the peripheral area of said injection well, said peripheral area bounded by a non-intersecting line passing through the immediate and adjacent plurality of wells surrounding said injection well, simultaneously injecting said solvent into said injection well, and thereafter discontinuing withdrawal of said influx fluids and producing oil from said formation through said production well.

5. In a subterranean oil and gas bearing formation penetrated by rows of wells the method of recovering substantially all of the oil and a minor portion of the gas comprising the steps:
 (a) injecting water at the gas-oil interface,
 (b) selecting one of the wells in one of the rows as an injection well downstream from the point of water injection,
 (c) selecting a plurality of wells, in line with and upstream from and surrounding said injection well,
 (d) selecting at least one well downstream from said injection well as a production well,
 (e) producing a portion of the water injected at the oil-gas interface from the plurality of wells selected surrounding said injection well and simultaneously injecting a petroleum solvent into said injection well,
 (f) thereafter discontinuing production of water from the wells surrounding said injection well, and
 (g) recovering oil, solvent, water and gas from said production well.

6. The method according to claim 5 wherein water is continually produced from the plurality of wells surrounding the injection well and a driving fluid is injected immediately behind the solvent.

7. The method according to claim 5 wherein a driving fluid is additionally injected immediately subsequent to the solvent.

8. The method of treating a portion of a fluid flooded subterranean oil-bearing formation into which has been drilled a first injection well and a producing well wherein a first aqueous fluid is continuously injected into said first injection well and driven through said formation to the producing well, the improvement which comprises withdrawing formation fluid including a portion of said first fluid within the area immediate and adjacent to a second injection well intermediate between said first injection well and producing well prior to injection of treating fluid into said second injection well whereby the withdrawal of said formation fluids and said first fluid creates a pressure gradient relative to the remainder of said formation surrounding said second injection well and injecting said treating fluid through said second injection well wherein the sweep efficiency of said treating fluid is increased.

References Cited by the Examiner

UNITED STATES PATENTS 2,924,276  2/1960  Heilman et al. _____ 166—11
3,113,616  12/1963  Dew et al. _____ 166—9

FOREIGN PATENTS 726,712  3/1955  Great Britain.

CHARLES E. O'CONNELL, *Primary Examiner.*

S. J. NOVOSAD, *Assistant Examiner.*